US012743664B2

(12) United States Patent
Jadon et al.

(10) Patent No.: US 12,743,664 B2
(45) Date of Patent: Sep. 22, 2026

(54) UTILIZING AN ENSEMBLE-BASED MACHINE LEARNING MODEL ARCHITECTURE FOR LONG TERM FORECASTING OF DATA

(71) Applicant: Juniper Networks, Inc., Sunnyvale, CA (US)

(72) Inventors: Shruti Jadon, San Jose, CA (US); Ajit Krishna Patankar, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1051 days.

(21) Appl. No.: 17/806,550

(22) Filed: Jun. 13, 2022

(65) Prior Publication Data

US 2024/0095603 A1 Mar. 21, 2024

(51) Int. Cl.
*G06N 20/20* (2019.01)
*G16Y 40/20* (2020.01)

(52) U.S. Cl.
CPC .............. *G06N 20/20* (2019.01); *G16Y 40/20* (2020.01)

(58) Field of Classification Search
CPC ........... G06N 20/20; G06N 3/098; G06N 3/08
See application file for complete search history.

(56) References Cited

U.S. PATENT DOCUMENTS 9,672,474 B2 6/2017 Dirac et al.
10,963,810 B2 3/2021 Dirac et al.
2020/0076520 A1* 3/2020 Jana .................... H04B 17/327
2020/0311615 A1 10/2020 Jammalamadaka et al.
2021/0264375 A1* 8/2021 Himura .................. G06Q 10/04
2021/0287310 A1* 9/2021 Chongfuangprinya ..................... G06N 20/20
2021/0297171 A1 9/2021 Jornod et al.
(Continued)

FOREIGN PATENT DOCUMENTS

CN 112070270 A 12/2020
CN 112712166 A 4/2021
CN 113498071 A 10/2021
(Continued)

OTHER PUBLICATIONS

NPL A NN ensemble method with jittered training data for time series 2007.*

(Continued)

*Primary Examiner* — Paul M Knight
(74) *Attorney, Agent, or Firm* — Harrity & Harrity, LLP

(57) ABSTRACT

A device may receive time series data, and may define a first quantity of steps into past data utilized to make future predictions, a second quantity of steps into the future predictions, and a third quantity of steps to skip in the future predictions. The device may determine whether the second quantity is equal to the third quantity. When the second quantity is equal to the third quantity, the device may process the time series data, with a plurality of machine learning models, to generate a plurality of future predictions that do not overlap, may merge the plurality of future predictions into a list of future predictions, and may provide the list for display. When the second quantity is not equal to the third quantity, the device may process the time series data, with the plurality of machine learning models, to generate another plurality of future predictions that do overlap.

20 Claims, 13 Drawing Sheets

(56) References Cited

U.S. PATENT DOCUMENTS

2023/0305904 A1* 9/2023 Lowe .................... G06N 20/20

FOREIGN PATENT DOCUMENTS

| | | | |
|---|---|---|---|
| CN | 113614756 | A | 11/2021 |
| JP | 2020-035004 | A | 3/2020 |
| WO | 2021/157327 | A1 | 8/2021 |

OTHER PUBLICATIONS

NPL Armstrong Combining Forecasts 2001.*
NPL Cho Heterogeneous Ensemble Knowledge Transfer Apr. 2022.*
NPL Galacia Multistep forecasting for TS ensemble learning 2018.*
NPL Gastinger A study on Ensemble Learning for Time Series 2021.*
NPL Liu Shallow deep ensemble models for network device workload 2020.*
NPL Melin A new approach for time series prediction using ensembles 2012.*
NPL Pardo Ensemble Feature Selection 2016.*
NPL Qiu Ensemble Deep Learning for Regression and TS Forecasting 2014.*
NPL Wu The ensemble approach to forecasting 2021.*
NPL Zou Combining time series models for forecasting 2004.*
Amstrong, J.S., "Combining Forecasts, "Principles of Forecasting, Jan. 2001, pp. 417-439.
Extended European Search Report for Application No. EP23178498.4, mailed Oct. 17, 2023, 10 Pages.
Wu, et al., "The Ensemble Approach to Forecasting: a Review and Synthesis, "Transportation Research Part C: Emerging Technologies, Sep. 2021, vol. 132, pp. 1-33.
Jianing Guo, "Research on Mid- and Short-term Forecast Methods of Thermal Coal Price", May 31, 2021, 63 pages.
Pavlovski et al., "Adaptive Skip-Train Structured Regression for Temporal Networks", Dec 30, 2017, 16 pages.

* cited by examiner

100

IoT devices

UTILIZING AN ENSEMBLE-BASED MACHINE LEARNING MODEL ARCHITECTURE FOR LONG TERM FORECASTING OF DATA

BACKGROUND

Forecasting is a technique that uses historical data as inputs to make informed predictions that determine a direction of future trends. For example, a business may utilize forecasting to determine how to allocate budgets or plan for anticipated expenses for an upcoming time period.

SUMMARY

Some implementations described herein relate to a method. The method may include receiving time series data, and defining a first quantity of steps into past data utilized to make future predictions. The method may include defining a second quantity of steps into the future predictions, and defining a third quantity of steps to skip in the future predictions. The method may include determining whether the second quantity is equal to the third quantity. When the second quantity is equal to the third quantity, the method may include processing the time series data, with each of a plurality of machine learning models, to generate a plurality of future predictions that do not overlap, merging the plurality of future predictions into a list of future predictions, and providing the list for display. When the second quantity is not equal to the third quantity, the method may include processing the time series data, with each of the plurality of machine learning models, to generate another plurality of future predictions that do overlap.

Some implementations described herein relate to a device. The device may include one or more memories and one or more processors. The one or more processors may be configured to receive time series data, and define a first quantity of steps into past data utilized to make future predictions. The one or more processors may be configured to define a second quantity of steps into the future predictions, and define a third quantity of steps to skip in the future predictions. The one or more processors may be configured to determine whether the second quantity is equal to the third quantity. When the second quantity is equal to the third quantity, the one or more processors may be configured to process the time series data, with each of a plurality of machine learning models, to generate a plurality of future predictions that do not overlap, and merge the plurality of future predictions into a list of future predictions. When the second quantity is not equal to the third quantity, the one or more processors may be configured to process the time series data, with each of the plurality of machine learning models, to generate another plurality of future predictions that do overlap, average values of the other plurality of future predictions that overlap to generate averaged future predictions, merge the other plurality of future predictions, based on the averaged future predictions, into another list of future predictions, and perform one or more actions based on the list or the other list.

Some implementations described herein relate to a non-transitory computer-readable medium that stores a set of instructions for a device. The set of instructions, when executed by one or more processors of the device, may cause the device to receive time series data, and define a first quantity of steps into past data utilized to make future predictions. The set of instructions, when executed by one or more processors of the device, may cause the device to define a second quantity of steps into the future predictions, and define a third quantity of steps to skip in the future predictions. The set of instructions, when executed by one or more processors of the device, may cause the device to determine whether the second quantity is equal to the third quantity. When the second quantity is equal to the third quantity, the set of instructions, when executed by one or more processors of the device, may cause the device to process the time series data, with each of a plurality of machine learning models, to generate a plurality of future predictions that do not overlap, and merge the plurality of future predictions into a list of future predictions. When the second quantity is not equal to the third quantity, the set of instructions, when executed by one or more processors of the device, may cause the device to process the time series data, with each of the plurality of machine learning models, to generate another plurality of future predictions that do overlap, average values of the other plurality of future predictions that overlap to generate averaged future predictions, merge the other plurality of future predictions, based on the averaged future predictions, into another list of future predictions, and provide the list or the other list for display.

DETAILED DESCRIPTION

Figure 1A:
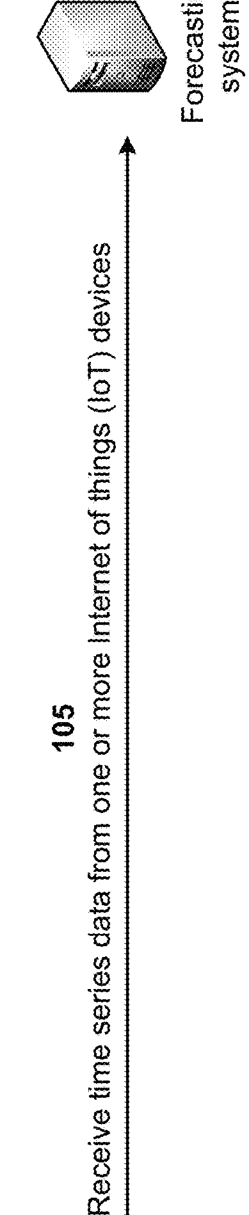
FIGS. 1A-1J are diagrams of an example associated with utilizing an ensemble-based machine learning model architecture for long term forecasting of data.
Figure 1A:
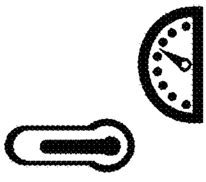
Figure 1A:
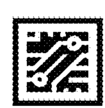
Figure 1A:

The following detailed description of example implementations refers to the accompanying drawings. The same reference numbers in different drawings may identify the same or similar elements.

Forecasting many steps (e.g., time periods) into the future may generate erroneous results since general machine learning models fail to make accurate long term predictions. A machine learning model may include limits where the machine learning model is unable to generate an accurate prediction. Creating models that can provide long term forecasting requires a large quantity of data, significant computation power, and large capacity neural network architectures. However, certain applications require long term forecasts without consuming the large quantity of data and the significant computation power and without creating large capacity neural networks. Thus, current techniques for generating long term forecasts consume computing resources (e.g., processing resources, memory resources, communication resources, and/or the like), networking resources, and/or the like, associated with consuming a large quantity of data and significant computation power to generate correct long term forecasts, creating large capacity neural networks to generate correct long term forecasts, generating incorrect long term forecasts, handling customer complaints associated with the incorrect long term forecasts, and/or the like.

Some implementations described herein relate to a forecasting system that utilizes an ensemble-based machine learning model architecture for long term forecasting of data. For example, the forecasting system may receive time series data, and may define a first quantity of steps into past data utilized to make future predictions. The forecasting system may define a second quantity of steps into the future predictions, and may define a third quantity of steps to skip in the future predictions. The forecasting system may determine whether the second quantity is equal to the third quantity. When the second quantity is equal to the third quantity, the forecasting system may process the time series data, with each of a plurality of machine learning models, to generate a plurality of future predictions that do not overlap, and may merge the plurality of future predictions into a list of future predictions. When the second quantity is not equal to the third quantity, the forecasting system may process the time series data, with each of the plurality of machine learning models, to generate another plurality of future predictions that do overlap based on the second quantity not being equal to the third quantity, may average values of the other plurality of future predictions that overlap to generate averaged future predictions, may merge the other plurality of future predictions, based on the averaged future predictions, into another list of future predictions, and may perform one or more actions based on the list or the other list. As used herein the terms "past" and "future" may be determined relative to a present time and may be measured in second, minutes, days, months, years, and/or the like.

In this way, the forecasting system utilizes an ensemble-based machine learning model architecture for long term forecasting of data. For example, the forecasting system may create multiple machine learning models, and may merge outputs of the multiple machine learning models to provide a long term forecast of the data (e.g., telemetry data, time series data, and/or the like). The forecasting system may cause different portions of input data to be processed by different machine learning models, and may average portions of output data, of the machine learning models, associated with overlapping portions of the input data processed by the machine learning models. The forecasting system may merge the output data, after averaging the portions of the output data, to generate a long term forecast. Thus, the forecasting system conserves computing resources, networking resources, and/or the like that would otherwise have been consumed by consuming a large quantity of data and significant computation power to generate correct long term forecasts, creating large capacity neural networks to generate correct long term forecasts, generating incorrect long term forecasts, handling customer complaints associated with the incorrect long term forecasts, and/or the like.

FIGS. 1A-1J are diagrams of an example 100 associated with utilizing an ensemble-based machine learning model architecture for long term forecasting of data. As shown in FIGS. 1A-1J, example 100 includes a forecasting system associated with a plurality of Internet of things (IoT) devices. The forecasting system may include a system that utilizes an ensemble-based machine learning model architecture for long term forecasting of data. Further details of the forecasting system and the IoT devices are provided elsewhere herein.

As shown in FIG. 1A, and by reference number 105, the forecasting system may receive time series data from one or more Internet of things (IoT) devices. For example, the plurality of IoT devices may periodically generate the time series data (e.g., telemetry data), may continuously generate the time series data, may generate the time series data based upon a request from the forecasting system, and/or the like. The forecasting system may periodically receive the time series data from the plurality of IoT devices, may continuously receive the time series data from the plurality of IoT devices, may receive the time series data from the plurality of IoT devices based upon a request, and/or the like.

The time series data may include data identifying activation time periods of the IoT devices (e.g., time periods during which the IoT devices are powered on and activated); deactivation times of the IoT devices (e.g., time periods when the IoT devices are powered off and deactivated); usage time periods associated with the IoT devices; usage controls of the IoT devices (e.g., detection precisions, detection sensitivities, and/or the like of the IoT devices); types of the IoT devices; identifiers of the IoT devices (e.g., serial numbers, manufacturers, network addresses, and/or the like of the IoT devices); and/or the like. In some implementations, the time series data may include a collection of observations obtained through repeated measurements over time, and may be received from one or more sources other than the IoT devices.

Figure 1B:
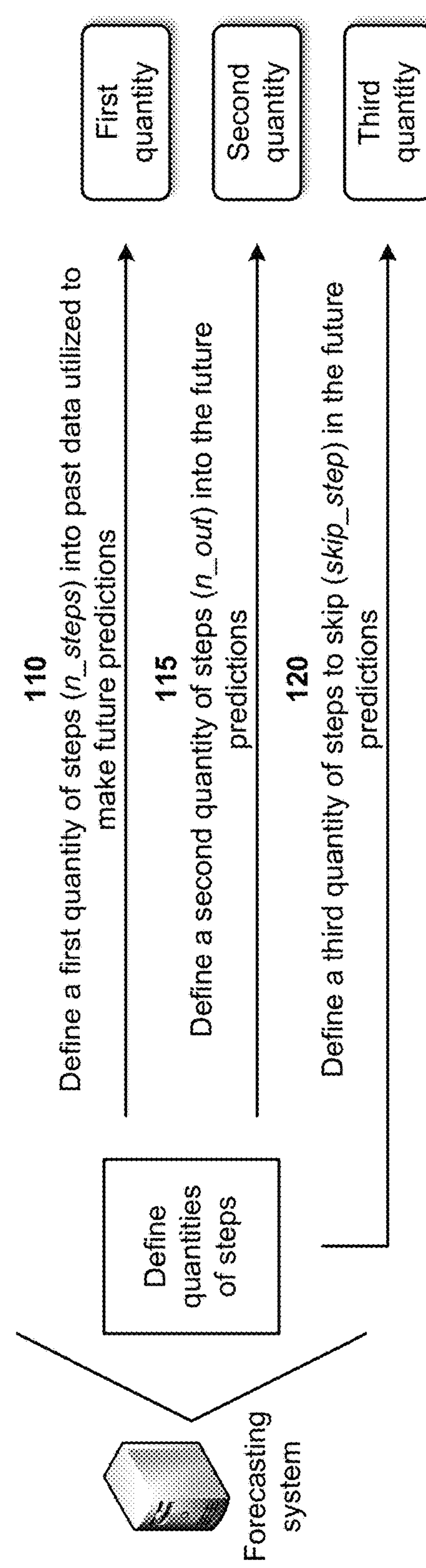

As shown in FIG. 1B, and by reference number 110, the forecasting system may define a first quantity of steps (e.g., n_steps) into past data utilized to make future predictions. For example, the forecasting system may utilize a portion of the past data to make the future predictions, all of the past data to make the future predictions, and/or the like. The past data (e.g., the time series data) may include data points associated with time steps, and the forecasting system may define the first quantity of steps (e.g., time steps), and associated data points, to utilize to make the future predictions. For example, the forecasting system may determine that all of the past data is to be utilized to make the future predictions, and the past data may include ten, twenty, one hundred, and/or the like time steps. In such an example, the forecasting system may define the first quantity of steps as ten, twenty, one hundred, and/or the like. In some implementations, the forecasting system may automatically define the first quantity of steps into the past data to utilize to make the future predictions. Alternatively, or additionally, the forecasting system may receive data identifying the first quantity of steps from a user input to the forecasting system.

As further shown in FIG. 1B, and by reference number 115, the forecasting system may define a second quantity of steps (e.g., n_out) into the future predictions. For example, the future predictions (e.g., time series predictions) may include data points associated with time steps, and the forecasting system may define the second quantity of steps (e.g., time steps), and associated data points, for the future predictions. For example, the forecasting system may determine that ten, twenty, one hundred, and/or the like future predictions are to be generated. In such an example, the forecasting system may define the second quantity of steps as ten, twenty, one hundred, and/or the like. In some implementations, the forecasting system may automatically define the second quantity of steps into the future predictions. Alternatively, or additionally, the forecasting system may receive data identifying the second quantity of steps from a user input to the forecasting system.

As further shown in FIG. 1B, and by reference number 120, the forecasting system may define a third quantity of steps to skip (e.g., skip_step) in the future predictions. For example, the future predictions may be generated by each of a plurality of machine learning models of the forecasting system, as described below. Each of the plurality of machine learning models may generate the future predictions for the second quantity of steps (e.g., time steps). However, each of the plurality of machine learning models may generate the second quantity of future predictions at different points of future times. The third quantity of steps (e.g., time steps)

may be utilized by the forecasting system to instruct the plurality of machine learning models as to how far out in time to generate the future predictions. For example, if a machine learning model processes a first quantity (e.g., [t, t+10]) of the past data to generate a second quantity (e.g., [t+15, t+20]) of future predictions, the machine learning model skips five time steps of the future predictions. In some implementations, the forecasting system may automatically define the third quantity of steps to skip in the future predictions. Alternatively, or additionally, the forecasting system may receive data identifying the third quantity of steps to skip from a user input to the forecasting system.

Figure 1C:
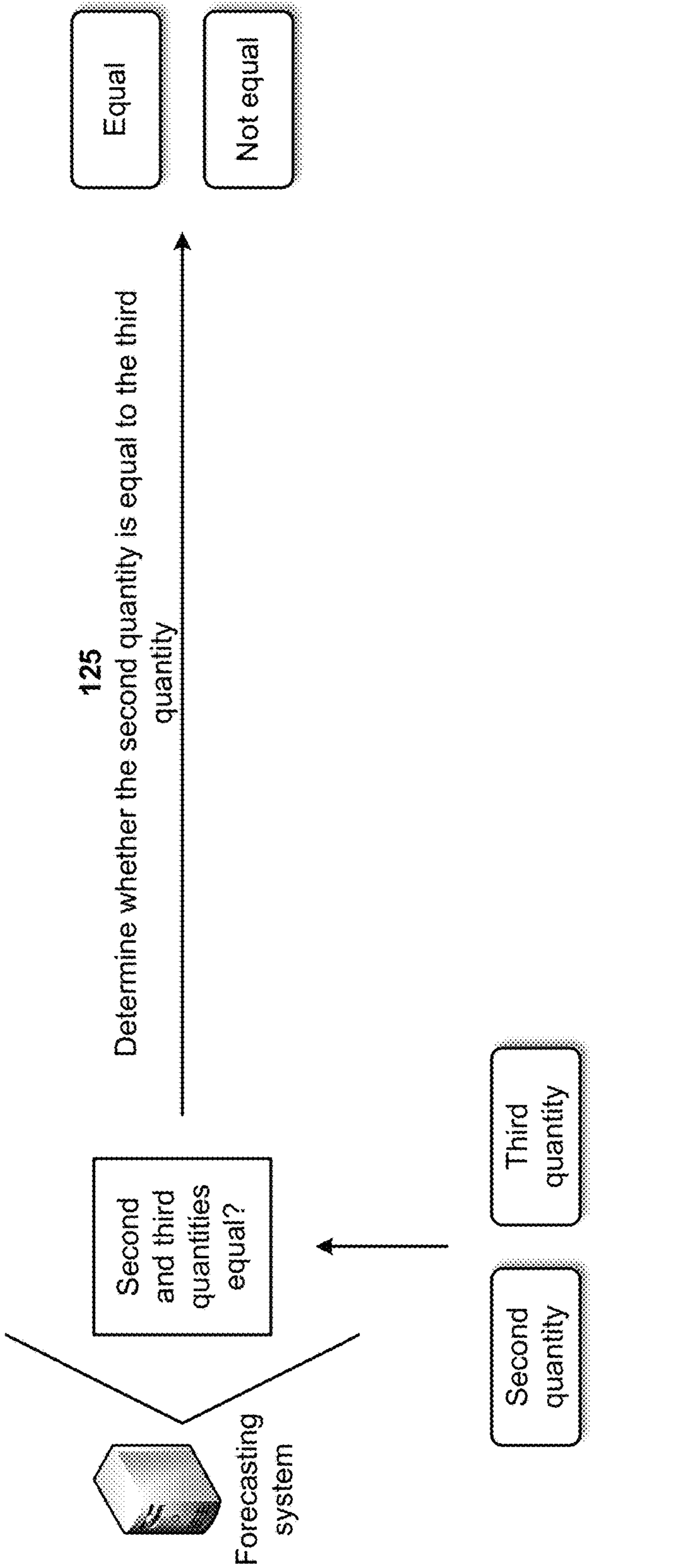

As shown in FIG. 1C, and by reference number 125, the forecasting system may determine whether the second quantity is equal to the third quantity. For example, the forecasting system may compare the second quantity and the third quantity, and may determine whether the second quantity is equal to the third quantity based on comparing the second quantity and the third quantity. In some implementations, the forecasting system may determine that the second quantity is equal to the third quantity. In such implementations, the future predictions generated by each of the plurality of machine learning models may not overlap future time steps. Alternatively, the forecasting system may determine that the second quantity is not equal to the third quantity. In such implementations, the future predictions generated by each of the plurality of machine learning models may overlap future time steps.

Figure 1D:
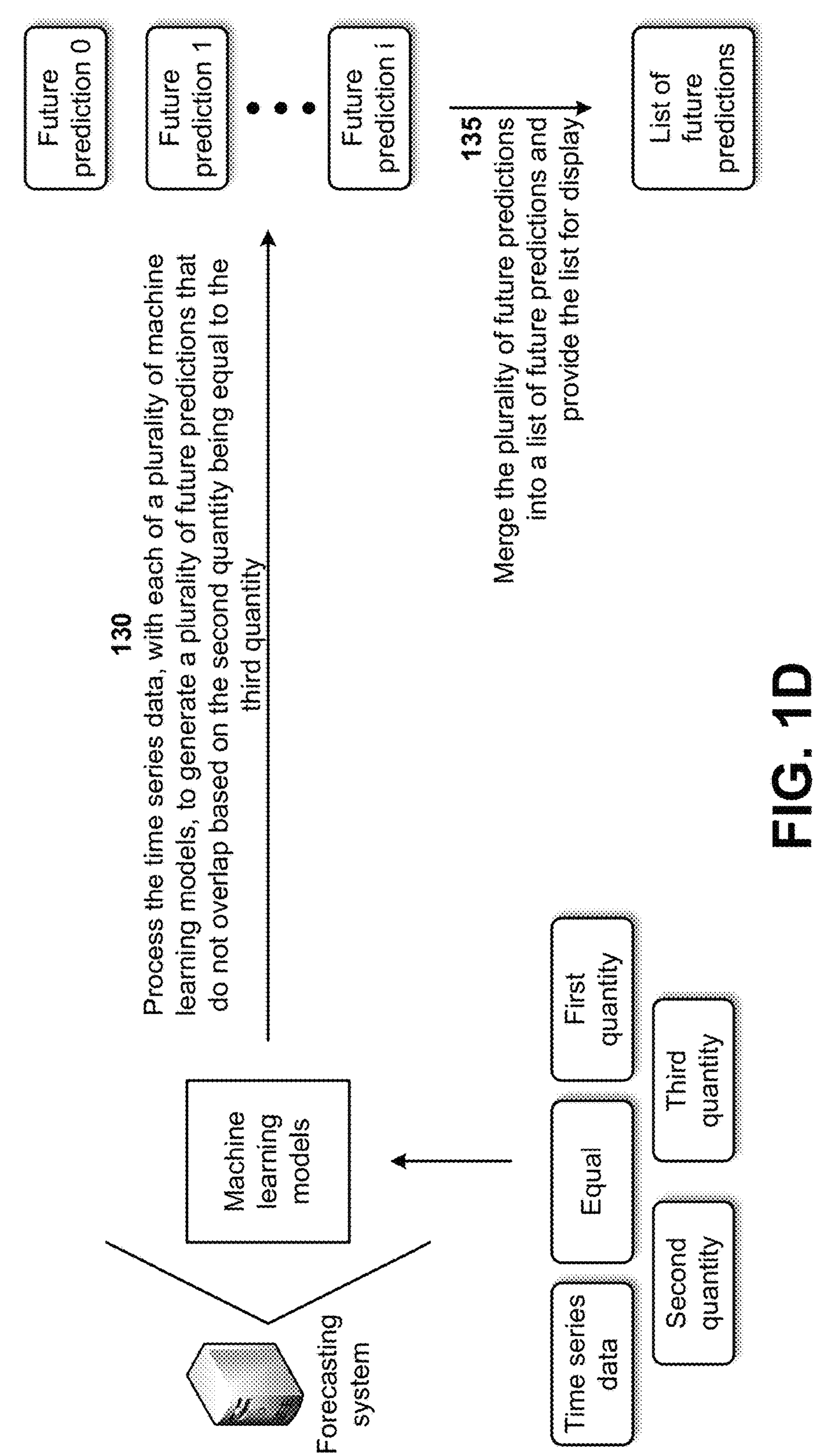

As shown in FIG. 1D, and by reference number 130, the forecasting system may process the time series data, with each of a plurality of machine learning models, to generate a plurality of future predictions that do not overlap based on the second quantity being equal to the third quantity. For example, when the second quantity is equal to the third quantity, the forecasting system may process the time series data, with each of the plurality of machine learning models, to generate a plurality of future predictions that do not overlap. In some implementations, a first machine learning model (e.g., model 0) may generate a first future prediction (e.g., future prediction 0), a second machine learning model (e.g., model 1) may generate a second future prediction (e.g., future prediction 1), . . . , and an ith machine learning model (e.g., model i) may generate an ith future prediction (e.g., future prediction i). An example of future predictions that do not overlap is provided below in connection with FIG. 1E.

Each of the plurality of machine learning models may include an autoregressive integrated moving average (ARIMA) machine learning model, a long short-term memory (LSTM) machine learning model, a probabilistic machine learning model, and/or the like. In some implementations, the plurality of machine learning models may include different types of machine learning models. For example, a first machine learning model may be an ARIMA machine learning model, a second machine learning model may be an LSTM machine learning model, a third machine learning model may be a probabilistic machine learning model, and/or the like. In some implementations, one or more of the plurality of machine learning models generating the plurality of future predictions at a greatest future time (e.g., furthest out in time) may include probabilistic machine learning models. In this way, the forecasting system provides independence in utilizing different features of different types of machine learning models. In some implementations, the forecasting system may train the plurality of machine learning models to generate the plurality of future predictions, may train the plurality of machine learning models to perform different tasks, and/or the like.

As further shown in FIG. 1D, and by reference number 135, the forecasting system may merge the plurality of future predictions into a list of future predictions and may provide the list for display. For example, the forecasting system may combine data identifying the plurality of future predictions into the list of future predictions. Since the plurality of future predictions do not overlap, the list of future predictions may include a continuous list of the future predictions out in time. In some implementations, when merging the plurality of future predictions into the list of future predictions, the forecasting system may apply a weight to each future prediction of the plurality of future predictions to generate a plurality of weighted future predictions, and may combine the plurality of weighted future predictions to generate the list of future predictions. In such implementations, the weights may be allocated based on a degree of precision associated with each of the plurality of future predictions. In this way, the forecasting system may provide an ensemble machine learning approach that reduces variances associated with the machine learning models.

The forecasting system may provide the list of future predictions for display to a user of the forecasting system. For example, the user may be associated with a user device (e.g., a computer, a mobile telephone, and/or the like) and the forecasting system may provide the list of future predictions to the user device. The user device may display the list of future predictions to the user.

In some implementations, the forecasting system may perform one or more actions based on the list of future predictions. For example, the forecasting system may utilize the list of future predictions (e.g., predictions of expected future expenses of a business) to generate a budget for the business during the time period captured by the future predictions. The forecasting system may provide the budget to one or more personnel of the business. In another example, the forecasting system may utilize the list of future predictions (e.g., predictions of parameters associated with the IoT devices) to identify potential IoT device issues associated with one or more parameters. The forecasting system may cause the IoT devices to modify the one or more parameters (e.g., to prevent the potential IoT device issues from the occurring in the future). In another example, the forecasting system may utilize the list of future predictions (e.g., predictions of outputs of machinery) to determine thresholds for the outputs of the machinery. The forecasting system may cause the machinery to generate alarms when the thresholds for the outputs are satisfied.

Figure 1E:
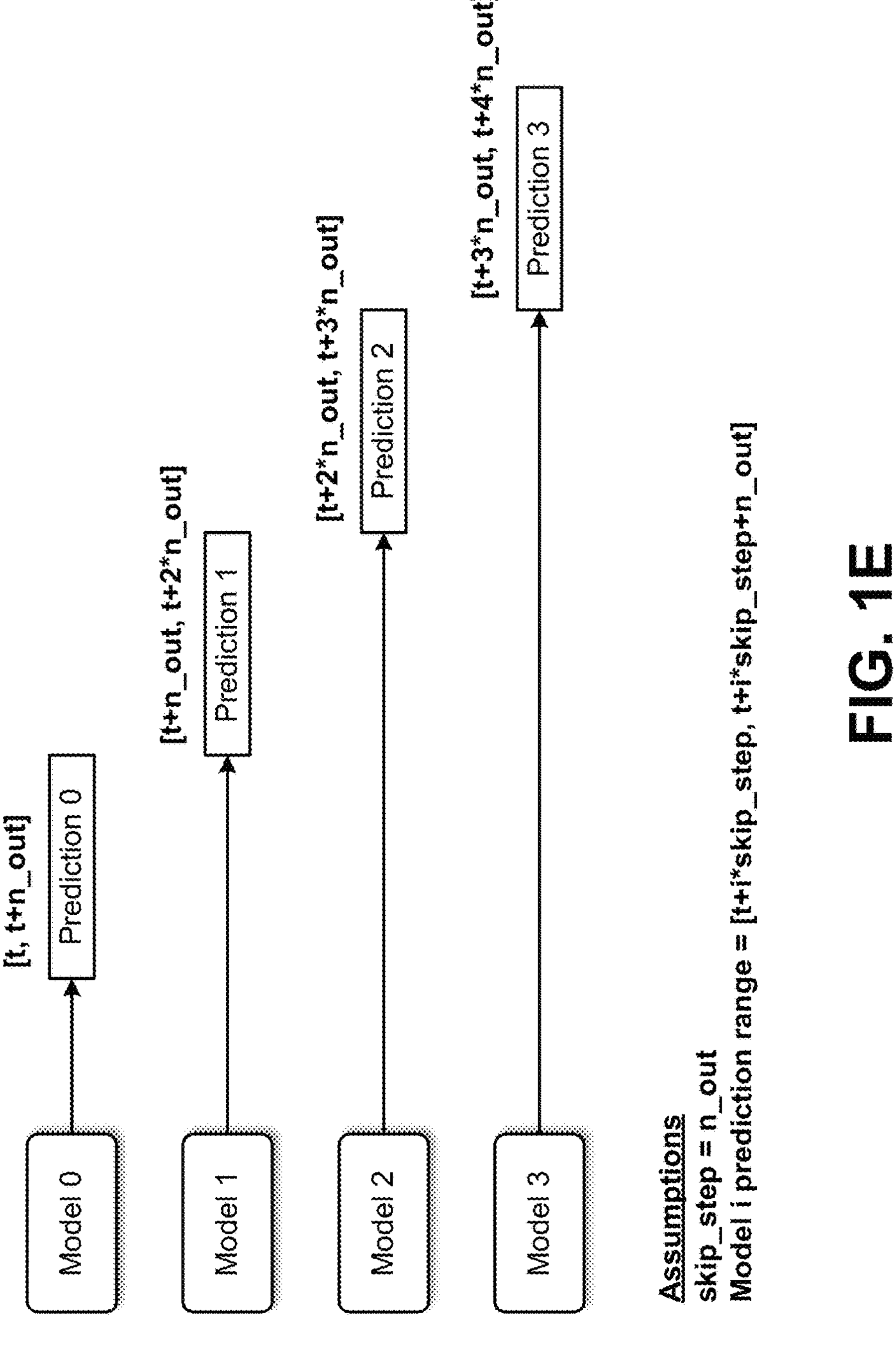

FIG. 1E depicts an example of future predictions that do not overlap (e.g., when the second quantity of steps n_out is equal to the third quantity of steps to skip skip_step). As shown, the forecasting system may include a first machine learning model (e.g., model 0), a second machine learning model (e.g., model 1), a third machine learning model (e.g., model 2), and a fourth machine learning model (e.g., model 3). Each of the machine learning models may include a prediction range of [t+i*skip_step, t+i*skip_step+n_out], and the second quantity of steps may be set to ten (10). In such an example, the first machine learning model may include a prediction range (e.g., prediction 0) of [t, t+n_out] or [t0, t10], the second machine learning model may include a prediction range (e.g., prediction 1) of [t+n_out, t+2*n_out] or [t10, t20], the third machine learning model may include a prediction range (e.g., prediction 2) of [t+n_out, t+3*n_out] or [t20, t30], and the fourth machine learning model may include a prediction range (e.g., prediction 3) of [t+n_out, t+4*n_out] or [t30, t40]. The forecasting system may merge the prediction ranges of the four machine learning models to generate a list of future predictions that do not overlap and are continuous in time.

Figure 1F:
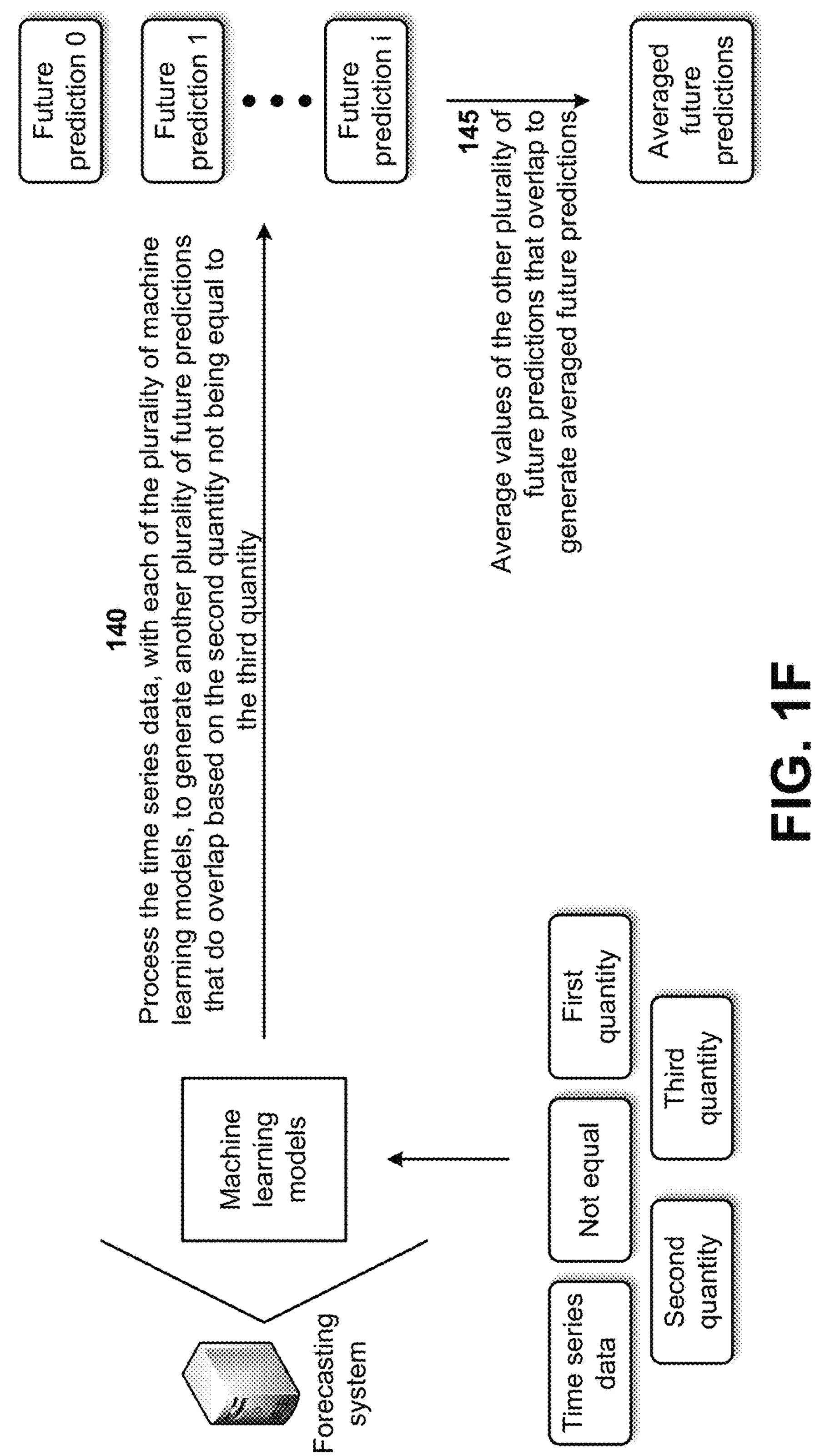

As shown in FIG. 1F, and by reference number 140, the forecasting system may process the time series data, with each of the plurality of machine learning models, to generate another plurality of future predictions that do overlap based on the second quantity not being equal to the third quantity. For example, when the second quantity is not equal to the third quantity (e.g., when the third quantity is less than the second quantity), the forecasting system may process the time series data, with each of the plurality of machine learning models, to generate the other plurality of future predictions that do overlap. In some implementations, the first machine learning model (e.g., model 0) may generate a first future prediction (e.g., future prediction 0), the second machine learning model (e.g., model 1) may generate a second future prediction (e.g., future prediction 1) that overlaps with the first future prediction, . . . , and an ith machine learning model (e.g., model i) may generate an ith future prediction (e.g., future prediction i) that overlaps with a previous future prediction (e.g., by model i−1). An example of future predictions that overlap is provided below in connection with FIG. 1G.

As further shown in FIG. 1F, and by reference number 145, the forecasting system may average values of the other plurality of future predictions that overlap to generate averaged future predictions. For example, the forecasting system may calculate an average or a mean of the values of the other plurality of future predictions that overlap, and may consider the averages or the means as the averaged future predictions. Averaging the values of the other plurality of future predictions that overlap may improve the accuracy of the other plurality of future predictions that overlap. In one example, when the third quantity is less than the second quantity, a first machine learning model may include a prediction range of [t0, t10] and a second machine learning model may include a prediction range of [t7, t17]. Thus, there is an overlap in the prediction ranges from step t7 to step t10 since both the first machine learning model and the second machine learning model are making predictions for these steps. In such an example, the forecasting system may average out values from step t7 to step t10 to generate the averaged future predictions.

Figure 1G:
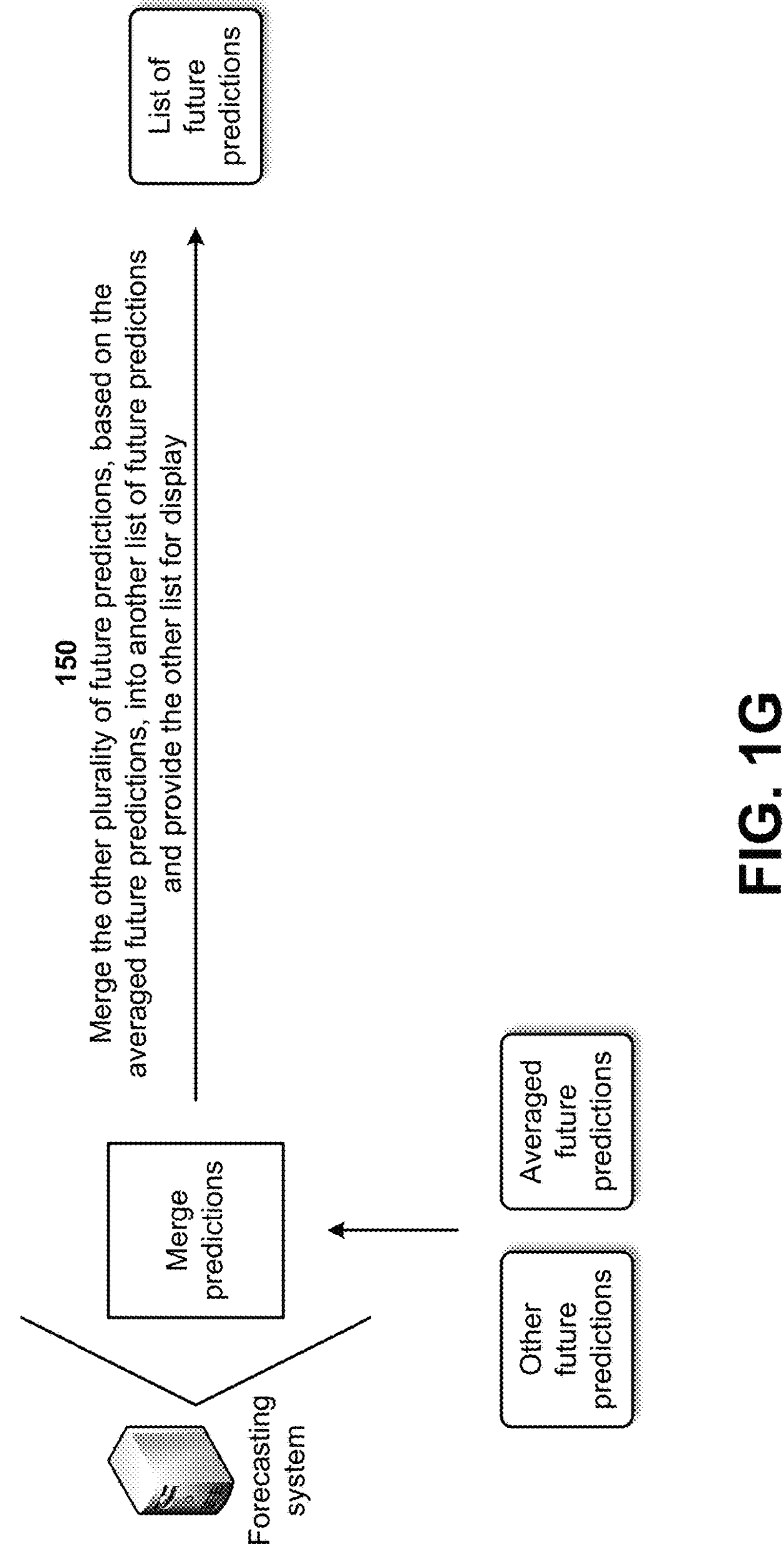

As shown in FIG. 1G, and by reference number 150, the forecasting system may merge the other plurality of future predictions, based on the averaged future predictions, into another list of future predictions and may provide the other list for display. For example, the forecasting system may combine data identifying the other plurality of future predictions (e.g., that are not averaged together) and the averaged future predictions into the other list of future predictions. The other list of future predictions may include a continuous list of the other future predictions out in time. In some implementations, when merging the other plurality of future predictions into the other list of future predictions, the forecasting system may apply a weight to each future prediction of the other plurality of future predictions to generate a plurality of weighted future predictions, and may combine the plurality of weighted future predictions to generate the other list of future predictions. In such implementations, the weights may be allocated based on a degree of precision associated with each of the other plurality of future predictions. In this way, the forecasting system may provide an ensemble machine learning approach that reduces variances associated with the machine learning models.

The forecasting system may provide the other list of future predictions for display to the user of the forecasting system. For example, the user may be associated with a user device and the forecasting system may provide the other list of future predictions to the user device. The user device may display the list of future predictions to the user. In some implementations, the forecasting system may perform the one or more actions, described above in connection with FIG. 1D, based on the other list of future predictions.

Figure 1H:
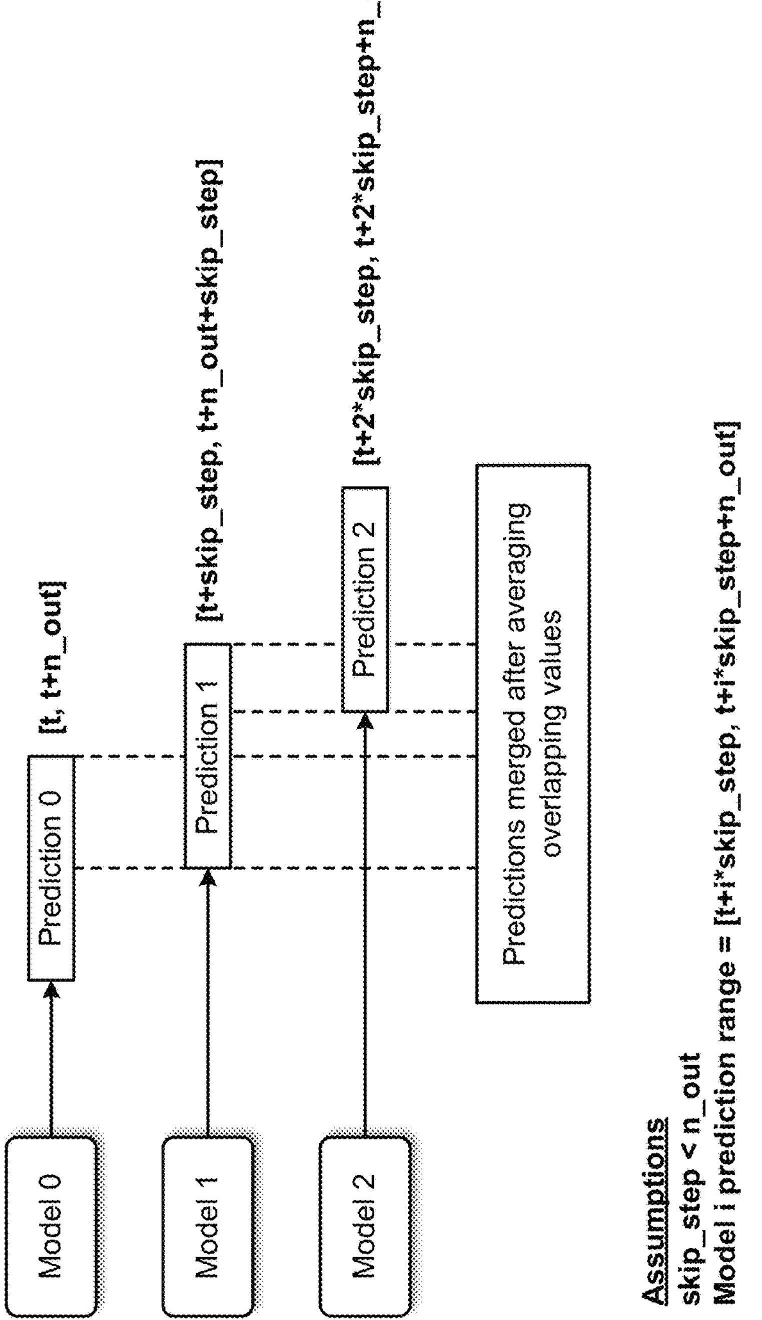

FIG. 1H depicts an example of future predictions that overlap (e.g., when the third quantity of steps to skip skip_step is less than the second quantity of steps n_out). As shown, the forecasting system may include a first machine learning model (e.g., model 0), a second machine learning model (e.g., model 1), and a third machine learning model (e.g., model 2). Each of the machine learning models may include a prediction range of [t+i*skip_step, t+i*skip_step+n_out], the second quantity of steps may be set to ten (10), and the third quantity of steps to skip may be set to seven (7). In such an example, the first machine learning model may include a prediction range (e.g., prediction 0) of [t, t+n_out] or [t0, t10], the second machine learning model may include a prediction range (e.g., prediction 1) of [t+skip_step, t+n_out+skip_step] or [t7, t17], and the third machine learning model may include a prediction range (e.g., prediction 2) of [t+2*skip_step, t+2*skip_step+n_out] or [t14, t24]. Thus, there is an overlap in the prediction ranges from step t7 to step t10 and from step t14 to step t17. The forecasting system may average the values for steps t7 to t10 and for steps t14 to t17 to generate averaged future predictions. The forecasting system may merge the prediction ranges (e.g., other than averaged ranges) and the averaged future predictions to generate a list of future predictions that do not overlap and are continuous in time.

Figure 1I:
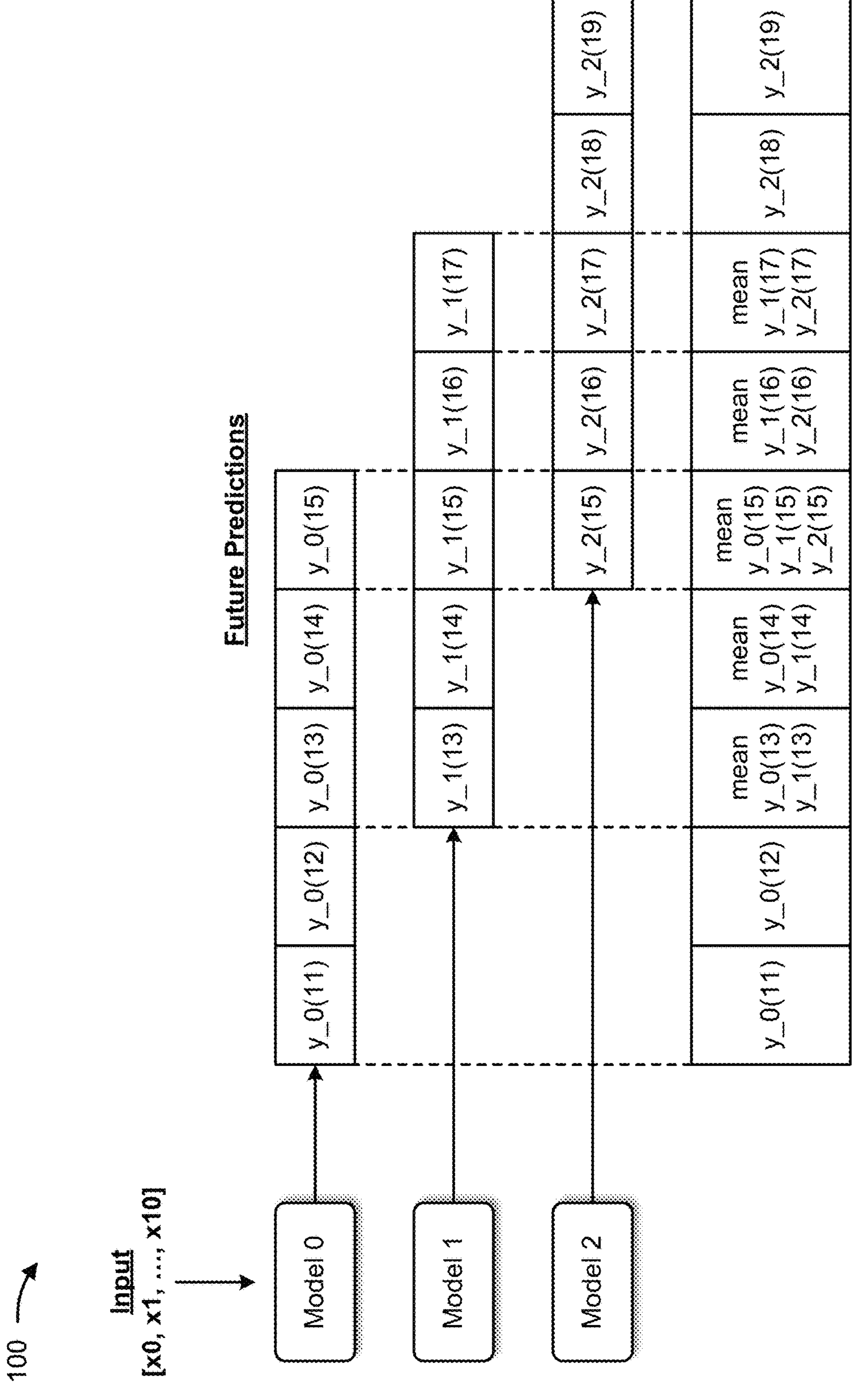

FIG. 1I depicts an example of predicting future predictions that overlap. As shown, the forecasting system may include a first machine learning model (e.g., model 0), a second machine learning model (e.g., model 1), and a third machine learning model (e.g., model 2). All of the machine learning models may include the same input (e.g., [x0, x1, . . . , x10]) and may generate five (5) steps of future predictions. The third quantity of steps to skip skip_step may equal two (2) and may be less than the second quantity of steps n_out. In such an example, the first machine learning model may include a prediction range of [y_0(11), y_0(12), y_0(13), y_0(14), y_0(15)], the second machine learning model may include a prediction range of [y_1(13), y_1(14), y_1(15), y_1(16), y_1(17)], and the third machine learning model may include a prediction range of [y_2(15), y_2(16), y_2(17), y_2(18), y_2(19)]. Thus, there is an overlap in the prediction ranges of the machine learning models.

As further shown in FIG. 1I, since the prediction ranges of the first machine learning model and the second machine learning model overlap for data points y_0(13) and y_1(13), the forecasting system may calculate a mean of the data points y_0(13) and y_1(13). Since the prediction ranges of the first machine learning model and the second machine learning model overlap for data points y_0(14) and y_1(14), the forecasting system may calculate a mean of the data points y_0(14) and y_1(14). Since the prediction ranges of the first machine learning model, the second machine learning model, and the third machine learning model overlap for data points y_0(15), y_1(15), and y 2(15), the forecasting system may calculate a mean of the data points y_0(15), y_1(15), and y 2(15). Since the prediction ranges of the second machine learning model and the third machine learning model overlap for data points y_1(16) and y 2(16), the forecasting system may calculate a mean of the data points y_1(16) and y 2(16). Since the prediction ranges of the second machine learning model and the third machine learning model overlap for data points y_1(17) and y 2(17), the forecasting system may calculate a mean of the data points y_1(17) and y_2(17). For the non-overlapping prediction ranges, the forecasting system may utilize the outputs of one of the three machine learning models (e.g., data points y_0(11), y_0(12), y_2(18), and y_2(19).

Figure 1J:
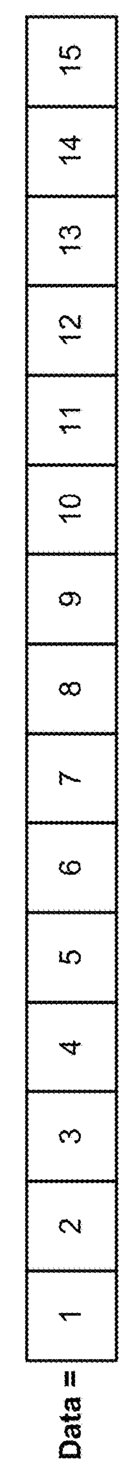
Figure 1J:
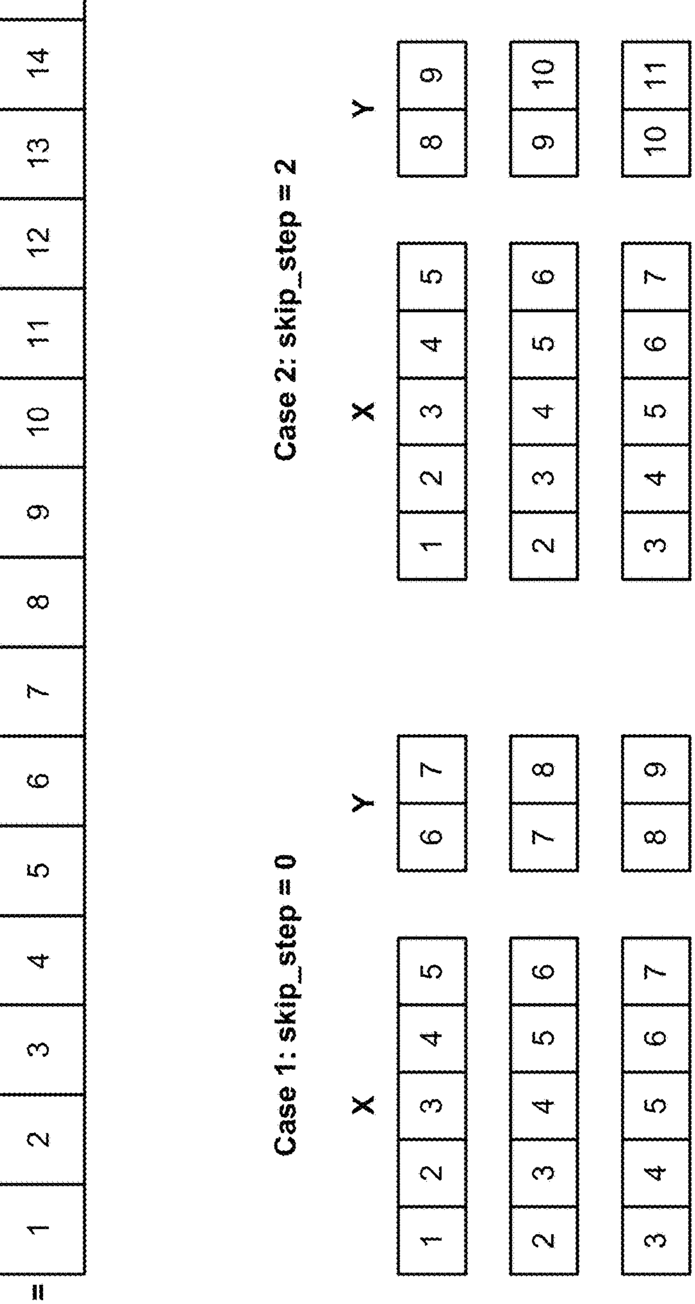

FIG. 1J depicts an example of how the forecasting system prepares input data (X) and output data (Y) to train the plurality of machine learning models. As shown, training data may include values of one (1) through fifteen (15), and a machine learning model being trained may utilize a first quantity of steps (e.g., n_steps) of five (5) and a second quantity of steps (e.g., n_out) of two (2). In a first case (e.g., Case 1), a third quantity of steps to skip (e.g., skip_step) may be set to zero (0), and the input data (X) may include ranges of values of one (1) through five (5), two (2) through six (6), and three (3) through seven (7). The output data (Y) may include ranges of value of six (6) and seven (7), seven (7) and eight (8), and eight (8) and nine (9). In a second case (e.g., Case 2), a third quantity of steps to skip (e.g., skip_step) may be set to two (2), the input data (X) may include the same ranges of values as the first case, and the output data (Y) may include ranges of value of eight (8) and nine (9), nine (9) and ten (10), and ten (10) and eleven (11).

In this way, the forecasting system utilizes an ensemble-based machine learning model architecture for long term forecasting of data. For example, the forecasting system may create multiple machine learning models, and may merge outputs of the multiple machine learning models to provide a long term forecast of the data (e.g., telemetry data, time series data, and/or the like). The forecasting system may cause different portions of input data to be processed by different machine learning models, and may average portions of output data, of the machine learning models, associated with overlapping portions of the input data processed by the machine learning models. The forecasting system may merge the output data, after averaging the portions of the output data, to generate a long term forecast. Thus, the forecasting system conserves computing resources, networking resources, and/or the like that would otherwise have been consumed by consuming a large quantity of data and significant computation power to generate correct long term forecasts, creating large capacity neural networks to generate correct long term forecasts, generating incorrect long term forecasts, handling customer complaints associated with the incorrect long term forecasts, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
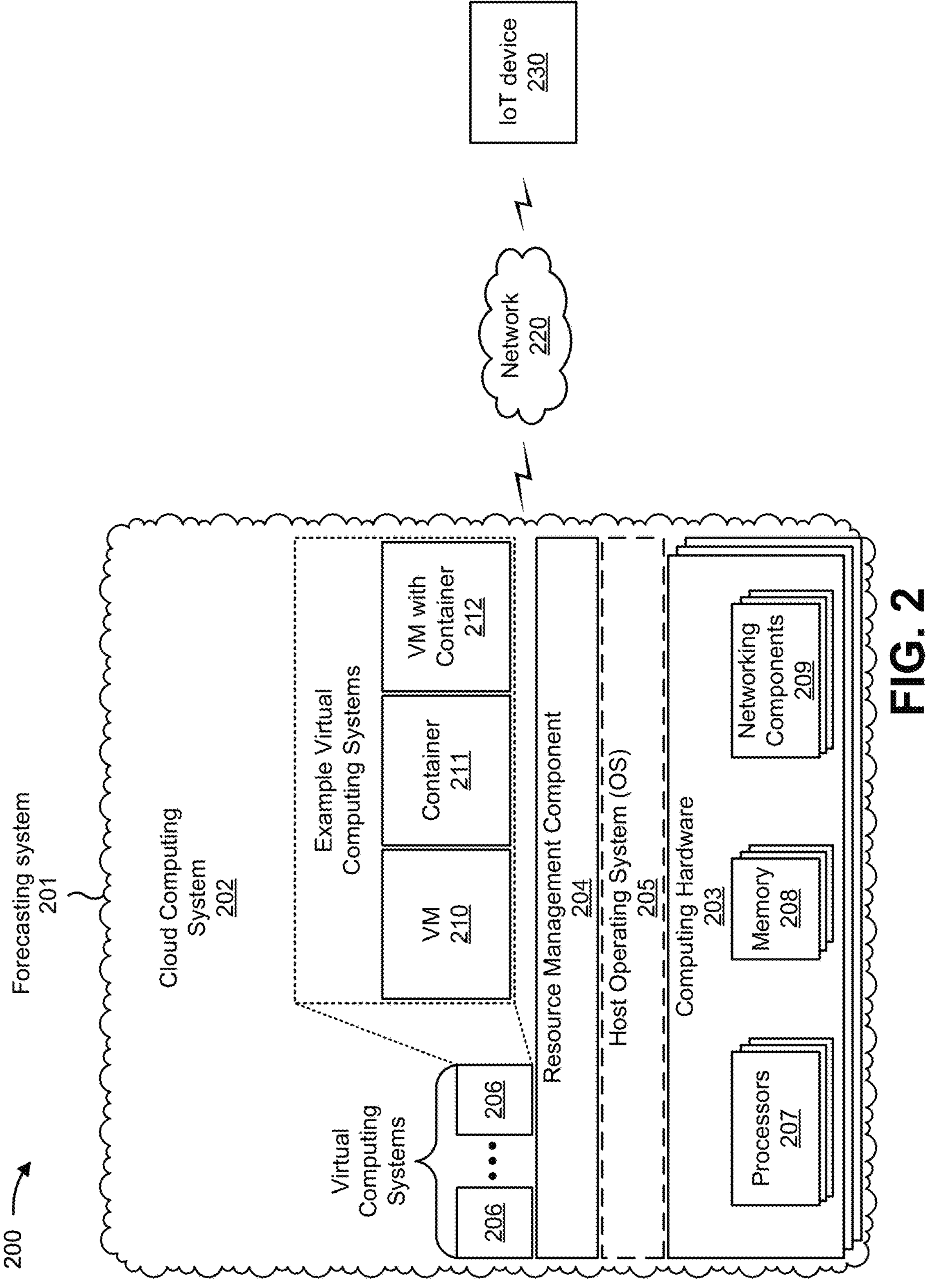
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a forecasting system 201, which may include one or more elements of and/or may execute within a cloud computing system 202. The cloud computing system 202 may include one or more elements 203-212, as described in more detail below. As further shown in FIG. 2, environment 200 may include a network 220 and/or an IoT device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the forecasting system 201 may include one or more elements 203-212 of the cloud computing system 202, may execute within the cloud computing system 202, and/or may be hosted within the cloud computing system 202, in some implementations, the forecasting system 201 may not be cloud-based (e.g., may be implemented outside of a cloud computing system) or may be partially cloud-based. For example, the forecasting system 201 may include one or more devices that are not part of the cloud computing system 202, such as device 300 of FIG. 3, which may include a standalone server or another type of computing device. The forecasting system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The IoT device 230 includes one or more devices capable of receiving, generating, storing, processing, and/or providing information, as described elsewhere herein. The IoT device 230 may include a communication device. For example, the IoT device 230 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), a video camera, a meter, a sensor, a connected vehicle, a tracker, an alarm panel, a manufacturing control system, or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
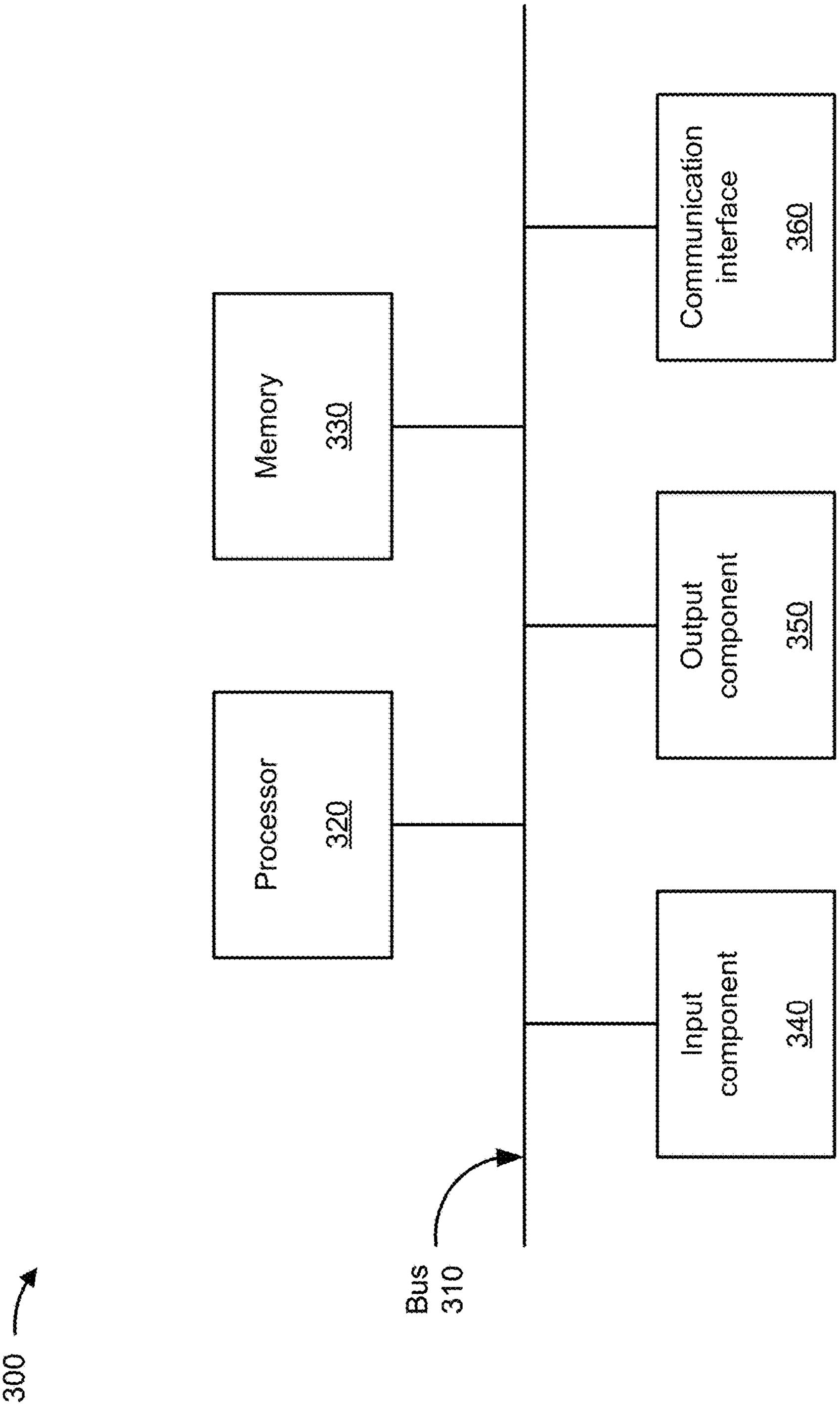
FIG. 3 is a diagram of example components of one or more devices of FIG. 2.

FIG. 3 is a diagram of example components of one or more devices of FIG. 2. The example components may be included in a device 300, which may correspond to the forecasting system 201 and/or the IoT device 230. In some implementations, the forecasting system 201 and/or the IoT device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
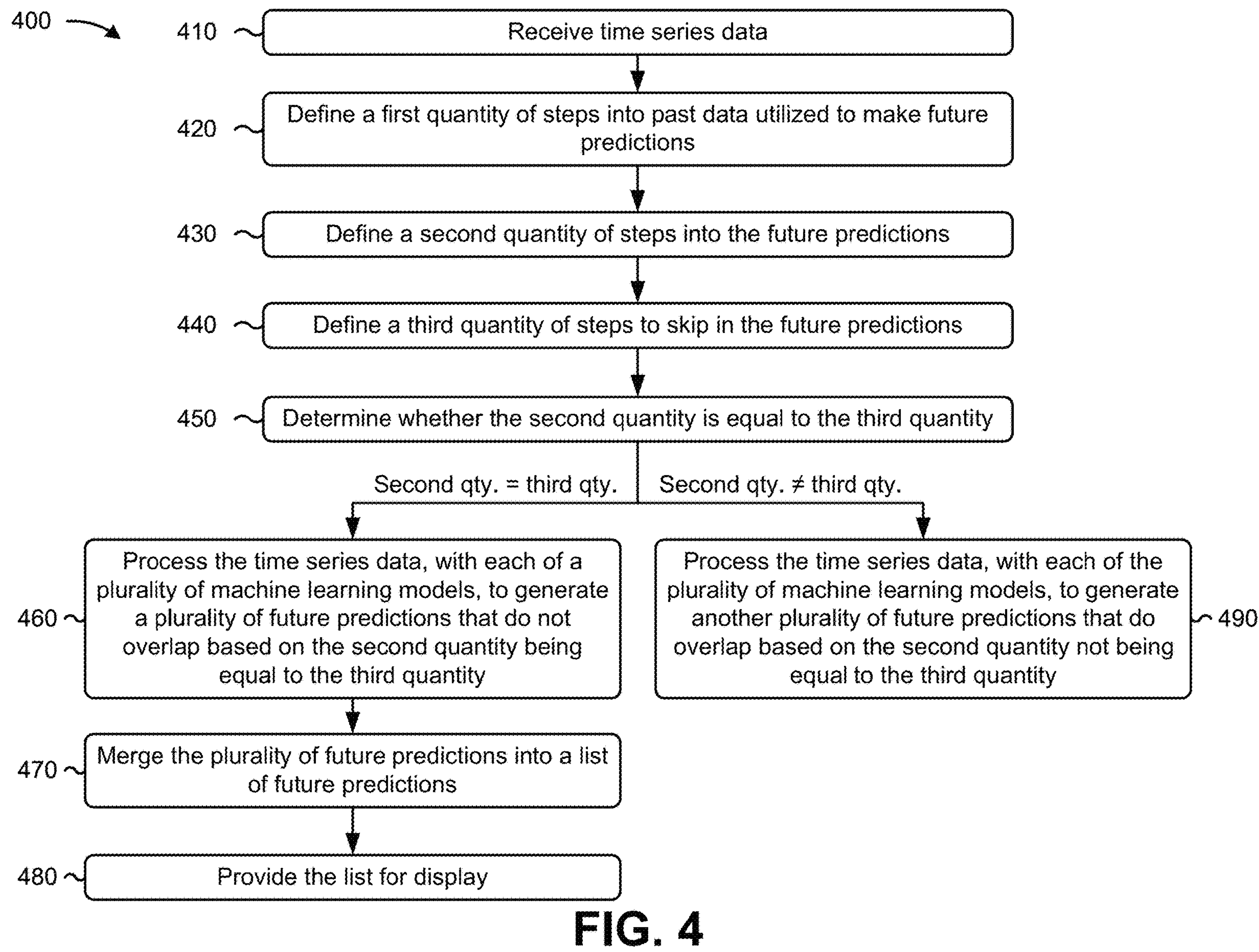
FIG. 4 is a flowchart of an example process for utilizing an ensemble-based machine learning model architecture for long term forecasting of data.

FIG. 4 is a flowchart of an example process 400 for utilizing an ensemble-based machine learning model architecture for long term forecasting of data. In some implementations, one or more process blocks of FIG. 4 may be performed by a device (e.g., the forecasting system 201). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving time series data (block 410). For example, the device may receive time series data, as described above. In some implementations, the time series data is telemetry data received from one or more Internet of things devices.

As further shown in FIG. 4, process 400 may include defining a first quantity of steps into past data utilized to make future predictions (block 420). For example, the device may define a first quantity of steps into past data utilized to make future predictions, as described above.

As further shown in FIG. 4, process 400 may include defining a second quantity of steps into the future predictions (block 430). For example, the device may define a second quantity of steps into the future predictions, as described above. In some implementations, the first quantity of steps includes steps into the past data utilized to make the second quantity of steps into the future predictions.

As further shown in FIG. 4, process 400 may include defining a third quantity of steps to skip in the future predictions (block 440). For example, the device may define a third quantity of steps to skip in the future predictions, as described above. In some implementations, the third quantity of steps to skip includes steps skipped in the second quantity of steps into the future predictions.

As further shown in FIG. 4, process 400 may include determining whether the second quantity is equal to the third quantity (block 450). For example, the device may determine whether the second quantity is equal to the third quantity, as described above.

As further shown in FIG. 4, process 400 may include processing the time series data, with each of a plurality of machine learning models, to generate a plurality of future predictions that do not overlap based on the second quantity being equal to the third quantity (block 460). For example, the device may process the time series data, with each of a plurality of machine learning models, to generate a plurality of future predictions that do not overlap based on the second quantity being equal to the third quantity, as described above.

In some implementations, the plurality of machine learning models are trained to make the plurality of future predictions. In some implementations, each of the plurality of machine learning models includes one of an autoregressive integrated moving average machine learning model, a long short-term memory machine learning model, or a probabilistic machine learning model. In some implementations, the plurality of machine learning models includes different types of machine learning models. In some implementations, one or more of the plurality of machine learning models generating the plurality of future predictions at a greatest future time include probabilistic machine learning models.

As further shown in FIG. 4, process 400 may include merging the plurality of future predictions into a list of future predictions (block 470). For example, the device may merge the plurality of future predictions into a list of future predictions, as described above. In some implementations, merging the plurality of future predictions into the list of future predictions includes applying a weight to each future prediction of the plurality of future predictions to generate a plurality of weighted future predictions, and combining the plurality of weighted future predictions to generate the list of future predictions.

As further shown in FIG. 4, process 400 may include providing the list for display (block 480). For example, the device provide the list for display, as described above.

As further shown in FIG. 4, process 400 may include processing the time series data, with each of the plurality of machine learning models, to generate another plurality of future predictions that do overlap based on the second quantity not being equal to the third quantity (block 490). For example, the device may process the time series data, with each of the plurality of machine learning models, to generate another plurality of future predictions that do overlap based on the second quantity not being equal to the third quantity, as described above.

In some implementations, process 400 includes averaging values of the other plurality of future predictions that overlap to generate averaged future predictions. In some implementations, process 400 includes merging the other plurality of future predictions, based on the averaged future predictions, into another list of future predictions, and providing the other list for display. In some implementations, merging the other plurality of future predictions, based on the averaged future predictions, into the other list of future predictions includes applying a weight to each future prediction of the other plurality of future predictions to generate a plurality of weighted future predictions, and combining the plurality of weighted future predictions to generate the other list of future predictions.

In some implementations, process 400 includes training the plurality of machine learning models to perform different tasks.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, time series data from one or more Internet of things (IOT) devices;

defining, by the device, a first quantity of steps into past data utilized to make future predictions associated with one or more parameters associated with the one or more IoT devices;

defining, by the device, a second quantity of steps into the future predictions;

defining, by the device, a third quantity of steps to skip in the future predictions;

determining, by the device, whether the second quantity is less than or equal to the third quantity; and selectively:

processing, by the device and based on the second quantity being less than or equal to the third quantity, the time series data, with each of a plurality of machine learning models, to generate a plurality of future predictions that do not overlap, merging, by the device, the plurality of future predictions into a list of future predictions, providing, by the device, the list for display, and causing the one or more IoT devices to modify the one or more parameters based on the plurality of future predictions to prevent potential issues associated with the one or more IoT devices from occurring; or processing, by the device and based on the second quantity not being less than or equal to the third quantity, the time series data, with each of the plurality of machine learning models, to generate another plurality of future predictions that do overlap, averaging values of the other plurality of future predictions that do overlap to generate averaged future predictions, and causing the one or more IoT devices to modify the one or more parameters based on the averaged future predictions to prevent potential issues associated with the one or more IoT devices from occurring.

2. The method of claim 1, wherein the plurality of machine learning models are trained to make the plurality of future predictions.

3. The method of claim 1, further comprising:

merging the other plurality of future predictions, based on the averaged future predictions, into another list of future predictions; and providing the other list for display.

4. The method of claim 3, wherein merging the other plurality of future predictions, based on the averaged future predictions, into the other list of future predictions comprises:

applying a weight to each future prediction of the other plurality of future predictions to generate a plurality of weighted future predictions; and combining the plurality of weighted future predictions to generate the other list of future predictions.

5. The method of claim 1, wherein the time series data is telemetry data received from the one or more IoT devices.

6. The method of claim 1, wherein the first quantity of steps includes steps into the past data utilized to make the second quantity of steps into the future predictions.

7. The method of claim 1, wherein the third quantity of steps to skip includes steps skipped in the second quantity of steps into the future predictions.

8. A device, comprising:

one or more memories; and one or more processors to:

receive time series data from one or more Internet of things (IoT) devices;

define a first quantity of steps into past data utilized to make future predictions associated with one or more parameters associated with the one or more IoT devices;

define a second quantity of steps into the future predictions;

define a third quantity of steps to skip in the future predictions;

determine whether the second quantity is less than or equal to the third quantity; and selectively:

process the time series data, with each of a plurality of machine learning models, to generate a plurality of future predictions that do not overlap based on the second quantity being less than or equal to the third quantity, merge the plurality of future predictions into a list of future predictions, and cause the one or more IoT devices to modify the one or more parameters based on the plurality of future predictions to prevent potential issues associated with the one or more IoT devices from occurring; or process the time series data, with each of the plurality of machine learning models, to generate another plurality of future predictions that do overlap based on the second quantity not being less than or equal to the third quantity, average values of the other plurality of future predictions that overlap to generate averaged future predictions, merge the other plurality of future predictions, based on the averaged future predictions, into another list of future predictions, cause the one or more IoT devices to modify the one or more parameters based on the averaged future predictions to prevent potential issues associated with the one or more IoT devices from occurring, and perform one or more actions based on the list or the other list.

9. The device of claim 8, wherein the plurality of machine learning models are trained to make the plurality of future predictions.

10. The device of claim 8, wherein each of the plurality of machine learning models includes one of:

an autoregressive integrated moving average machine learning model, a long short-term memory machine learning model, or a probabilistic machine learning model.

11. The device of claim 8, wherein the plurality of machine learning models includes different types of machine learning models.

12. The device of claim 8, wherein one or more of the plurality of machine learning models generating the plurality of future predictions at a greatest future time include probabilistic machine learning models.

13. The device of claim 8, wherein the one or more processors are further to:

train the plurality of machine learning models to perform different tasks.

14. The device of claim 8, wherein the one or more processors, to merge the plurality of future predictions into the list of future predictions, are to:

apply a weight to each future prediction of the plurality of future predictions to generate a plurality of weighted future predictions; and combine the plurality of weighted future predictions to generate the list of future predictions.

15. A non-transitory computer-readable medium storing a set of instructions, the set of instructions comprising:

one or more instructions that, when executed by one or more processors of a device, cause the device to:

receive time series data from one or more Internet of things (IoT) devices;

define a first quantity of steps into past data utilized to make future predictions associated with one or more parameters associated with the one or more IoT devices;

define a second quantity of steps into the future predictions;

define a third quantity of steps to skip in the future predictions;

determine whether the second quantity is less than or equal to the third quantity; and selectively:

process the time series data, with each of a plurality of machine learning models, to generate a plurality of future predictions that do not overlap based on the second quantity being less than or equal to the third quantity, merge the plurality of future predictions into a list of future predictions, and cause the one or more IoT devices to modify the one or more parameters based on the plurality of future predictions to prevent potential issues associated with the one or more IoT devices from occurring; or process the time series data, with each of the plurality of machine learning models, to generate another plurality of future predictions that do overlap based on the second quantity not being less than or equal to the third quantity, average values of the other plurality of future predictions that overlap to generate averaged future predictions, merge the other plurality of future predictions, based on the averaged future predictions, into another list of future predictions, cause the one or more IoT devices to modify the one or more parameters based on the averaged future predictions to prevent potential issues associated with the one or more IoT devices from occurring, and provide the list or the other list for display.

16. The non-transitory computer-readable medium of claim 15, wherein the plurality of machine learning models are trained to make the plurality of future predictions.

17. The non-transitory computer-readable medium of claim 15, wherein each of the plurality of machine learning models includes one of:

an autoregressive integrated moving average machine learning model, a long short-term memory machine learning model, or a probabilistic machine learning model.

18. The non-transitory computer-readable medium of claim 15, wherein the plurality of machine learning models includes different types of machine learning models.

19. The non-transitory computer-readable medium of claim 15, wherein one or more of the plurality of machine learning models generating the plurality of future predictions at a greatest future time include probabilistic machine learning models.

20. The non-transitory computer-readable medium of claim 15, wherein the one or more instructions further cause the device to:

train the plurality of machine learning models to perform different tasks.

* * * * *